Patented May 8, 1945

2,375,653

UNITED STATES PATENT OFFICE 2,375,653

ADHESIVITY OF ASPHALTS

August Holmes, Cranford, N. J., assignor, by mesne assignments, to Standard Catalytic Company, a corporation of Delaware No Drawing. Application September 15, 1939, Serial No. 295,047

9 Claims. (Cl. 106—281)

This invention relates to improvements in the art of road making and to the particular improvements whereby, first, a coating of bituminous bonding material is maintained on a mineral aggregate surface in the presence of water, and, second, the said coating or bonding of wet or damp mineral aggregate with a bituminous material can be obtained in the presence of water even though the mineral aggregate is damp or had been previously drenched with water before coating or bonding.

The bituminous coating created over the stone surface obtained according to this invention reduces greatly the deleterious effect of water to said coated surface due to the fact that the relative adhesivity of the asphalt so treated is greatly increased. By adhesivity is meant the resistance of a bituminous film to displacement from a stone surface by water.

In manufacturing a paving mixture in which the mineral aggregates consist mainly of gravel, sand, or other substances rich in silica which are often substantially acidic in character, the coating of the mineral particles may be performed by admixing a bituminous binder containing a wetting agent with the mineral aggregate in its natural moist state or after it has been drenched with water such as occurs after a rainstorm. The paving mixture may then be laid and rolled to amalgamate.

The following tables show comparative adhesivities of asphalts, some without wetting agents and others containing wetting agents. The percentage of the preferred wetting agent, oleyl amine, $C_{18}H_{35}NH_2$, that may be used varies from 0.25 to 5% or more. The maximum effect in coating wet trap-rock aggregate combined with subsequent adhesivity is obtained when 2.5% of oleyl amine, $C_{18}H_{35}NH_2$, is used, although larger amounts do not materially alter the adhesivity. Useful results can, however, be obtained when using quantities much less than 2.5%.

TABLE 1

Dry trap-rock—R. C. 2 cutback asphalt—Venezuelan binder "C" base

| Per cent oleyl amine (based on asphalt) | Adhesivity on dry aggregate | | |
|---|---|---|---|
| | Cured 1 hr. at room temp. in water 20 hrs. at room temp. | Cured 24 hrs. at 140° F. | |
| | | In water 20 hrs. at 140° F. | 1 min. boiling test |
| 1.25 | 100 | 100 | 100 |
| 0.35 | 100 | 0 to 10 | 70 to 80 |
| 0.00 | 0 to 10 | 0 to 10 | 5 to 20 |

TABLE 2

Water drenched trap-rock—R. C. 2 cutback asphalt—Venezuelan binder "C" base

| Per cent oleyl amine $C_{18}H_{35}NH_2$ (based on asph.) | Per cent coated on mixing | Adhesivity of drenched aggregate | | | |
|---|---|---|---|---|---|
| | | Stripping resistance | | Adhesivity | |
| | | Cured at R. T. 1 hr. in water 20 hrs. at R. T. | Cured at R. T. 4 hrs. in water 20 hrs. at R. T. | Cured 24 hrs. at 140° F. | |
| | | | | In water 20 hrs. at 140° F. | 1 min. boiling test |
| 2.5 | 100 | 100 | 100 | 100 | 100 |
| 0.50 | 100 | 90 | 100 | 90 | 100 |
| 0.25 | 80 to 90 | 20 to 30 | 90 | 40 | 70 |
| 0.00 | 40 to 50 | 0 | 0 | | |

The stripping resistance was carried out as follows: Mineral aggregate of ¼" to 10 mesh size is coated with 6% for the drenched stone of the bituminous composition in the form of a rapid curing cutback containing 67% of asphalt. After coating, the aggregate is spread out and cured for 1 hour or 4 hours at room temperature and is then completely covered with distilled water for 20 hours at room temperature. At the end of this period and while submerged, a preliminary estimate is made of the per cent of the aggregate surface still coated with asphalt.

The water displacement test measures the resistance of an asphalt to displacement by water at a temperature of 140° F. and consists in maintaining the coated aggregate (which has been cured for 24 hours at 140° F.) in distilled water for 20 hours at 140° F., and an estimate is then made of the per cent of the aggregate surface still coated with asphalt.

The water boiling test measures the resistance of an asphalt coating to displacement by water at its boiling point and consists in boiling the coated aggregate (which has been cured for 24 hours at 140° F.) in distilled water for one minute, and an estimate is then made of the per cent of the aggregate surface still coated with asphalt.

This improved process is particularly valuable in connection with mineral aggregates that are acidic and/or highly siliceous in character and also when bituminous roads are laid in damp or wet places which are generally impaired by prolonged contact with water.

I claim:

1. An improvement in the preparation of paving materials which comprises incorporating in a bituminous material oleyl amine, $C_{18}H_{35}NH_2$, and bonding a mineral aggregate with the said composition.

2. An improvement in the preparation of paving materials which comprises incorporating in an asphalt 0.25 to 5% of oleyl amine, $C_{18}H_{35}NH_2$, and bonding a mineral aggregate with the said asphaltic composition.

3. An improvement in the preparation of a paving material which comprises incorporating in an asphalt 0.25 to 2.5% of oleyl amine, $$C_{18}H_{35}NH_2$$

and bonding a mineral aggregate with the said material.

4. A paving composition comprising a mineral aggregate and an asphalt containing oleyl amine, $C_{18}H_{35}NH_2$.

5. A paving composition comprising a mineral aggregate and an asphalt with 0.25 to 5% of oleyl amine, $C_{18}H_{35}NH_2$, based on the asphalt incorporated in said material.

6. A paving composition comprising a mineral aggregate and an asphalt containing 0.25 to 2.5% of oleyl amine, $C_{18}H_{35}NH_2$, based on the asphalt.

7. An improved bituminous bonding material comprising a bituminous binder to which oleyl amine, $C_{18}H_{35}NH_2$, has been admixed.

8. An improved bituminous bonding material comprising a bituminous material and 0.25 to 5% of oleyl amine, $C_{18}H_{35}NH_2$.

9. An improved bituminous bonding material comprising a bituminous material and 2.5% of oleyl amine, $C_{18}H_{35}NH_2$.

AUGUST HOLMES.